(12) United States Patent
Ottesen et al.

(10) Patent No.: US 6,385,000 B1
(45) Date of Patent: May 7, 2002

(54) SYSTEM AND METHOD FOR EXTENDING THE OPERATING LIFE OF A MAGNETORESISTIVE TRANSDUCER PROVIDED IN A DISK DRIVE SYSTEM

(75) Inventors: Hal Hjalmar Ottesen; Gordon James Smith, both of Rochester; Donald R. Tobie, Zumbrota, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/137,983

(22) Filed: Aug. 21, 1998

(51) Int. Cl.[7] .............................................. G11B 15/12
(52) U.S. Cl. ........................ 360/63; 360/66; 360/77.05; 360/77.08
(58) Field of Search ............................... 360/63, 77.05, 360/77.08, 66

(56) References Cited

U.S. PATENT DOCUMENTS

| 5,412,518 A | * | 5/1995 | Christner et al. ............. 360/66 |
| 5,426,758 A | | 6/1995 | Candelaria et al. |
| 5,488,593 A | | 1/1996 | Furumiya et al. |
| 5,572,379 A | * | 11/1996 | Aoi et al. ...................... 360/66 |
| 5,606,470 A | * | 2/1997 | Shioya et al. ............. 360/78.04 |
| 5,859,738 A | * | 1/1999 | Forehand et al. ............. 360/75 |
| 6,031,683 A | * | 2/2000 | Iverson et al. ........... 360/78.04 |
| 6,163,425 A | * | 12/2000 | Isokawa et al. ................ 360/66 |

FOREIGN PATENT DOCUMENTS

| EP | 0643381 A2 | 3/1995 | ............ G11B/5/02 |
| EP | 0673032 A2 | 9/1995 | ........... G11B/21/02 |
| EP | 0866453 A2 | 9/1998 | ........... G11B/19/04 |
| JP | 410233003 A | * 9/1998 | ........... G11B/5/012 |

OTHER PUBLICATIONS

"Optimal Method of Increasing Life of Magnetoresistive Head in Sector Servo," *IBM Technical Disclosure Bulletin*, 34:6 426–427 (Nov. 1991).

* cited by examiner

Primary Examiner—David Hudspeth
Assistant Examiner—Dan I. Davidson
(74) Attorney, Agent, or Firm—Mark A. Hollingsworth (57) ABSTRACT

An apparatus and method for extending the service life of an MR element incorporated in a read/write head involves detecting periods of disk drive system inactivity and selectively switching between the heads for purposes of reading servo information during the inactive periods. Switching between heads may involve selecting each of the heads for reading servo information during one or more periods of disk drive system inactivity or selecting each of the heads in sequence during a respective period of system inactivity. Selecting between heads may also involve selecting a head having a minimum of usage, such as a head having an MR element with a minimum of cumulative operational time or energy dissipation relative to other MR elements provided in the disk drive system. Selecting between heads may further include selectively activating each of the heads for reading servo information for a predetermined duration of time during one or more periods of system idleness. An alternative method involves moving the head to a target location, such as a location of maximum head-to-disk clearance, over a surface of a data storage disk, and reducing the servo sampling rate during a period of system inactivity. Reducing the servo sampling rate involves reducing the rate from a nominal number of servo samples per disk revolution to a reduced number of servo samples per disk revolution, such as one servo sample per disk revolution. The MR elements may be selectively activated during idle periods so as to further reduce usage of the MR elements.

38 Claims, 10 Drawing Sheets

SYSTEM AND METHOD FOR EXTENDING THE OPERATING LIFE OF A MAGNETORESISTIVE TRANSDUCER PROVIDED IN A DISK DRIVE SYSTEM

FIELD OF THE INVENTION

The present invention relates generally to disk drive systems and, more particularly, to a system and method for extending the service life of a magnetoresistive element of a read/write head.

BACKGROUND OF THE INVENTION

A typical disk drive system includes a magnetic medium for storing data in magnetic form and a number of transducers used to write and read magnetic data respectively to and from the medium. A typical disk storage device, for example, includes one or more data storage disks coaxially mounted on a hub of a spindle motor. The spindle motor rotates the disks at speeds typically on the order of several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more read/write head assemblies being mounted thereon by use of flexible suspensions. A typical read/write head assembly is understood to include a slider body, a read element, and a write element. The slider body lifts the read/write elements off the surface of the disk as the rate of spindle motor rotation increases, and causes the read/write elements to hover above the disk on an air bearing produced by high speed disk rotation. The distance between a read/write head and the disk surface, which is typically on the order of 40–100 nanometers (nm), is commonly referred to as head-to-disk clearance or spacing.

Writing data to a magnetic data storage disk generally involves passing a current through a write element of the read/write head assembly to produce magnetic lines of flux which magnetize a specific location of the disk surface. Reading data from a specified disk location is typically accomplished by a read element of the read/write head assembly sensing the magnetic field or flux lines emanating from the magnetized locations of the disk. As the read element passes over the rotating disk surface, the interaction between the read element and the magnetized locations on the disk surface results in the production of electrical signals, commonly referred to as readback signals, in the read element.

Conventional disk drive systems generally employ a closed-loop servo control system for positioning the read/write elements, or transducers, to specified storage locations on the data storage disk. During normal disk drive system operation, a servo transducer, generally mounted proximate the read/write transducers, or, alternatively, incorporated as the read element of the read/write head assembly, is typically employed to read information for the purpose of following a specified track (i.e., track following) and locating (i.e., seeking) specified track and data sector locations on the disk.

In accordance with one known servo technique, embedded servo pattern information is written to the disk along segments extending in a direction generally outward from the center of the disk. The embedded servo patterns are thus formed between the data storing sectors of each track. It is noted that a servo sector typically contains a pattern of data, often termed a servo burst pattern, used to maintain optimum alignment of the read/write transducers over the centerline of a track when transferring data to and from specified data sectors on the track. The servo information may also include sector and track identification codes which are used to identify the location of the transducer.

Within the disk drive system manufacturing industry, much attention is presently being focused on the use of a magnetoresistive (MR) element, also referred to as an MR stripe, as a read transducer. Although an MR read/write head assembly, typically incorporating an MR read element and a thin-film write element, would appear to provide a number of advantages over conventional thin-film heads and the like, it is known by those skilled in the art that the limited life expectancy of a typical MR read element under normal operating conditions may dissuade developers of disk drive systems from utilizing MR transducers in disk drive units designed for moderate to high reliability applications.

By way of example, historical life expectancies of MR stripes have been stated at 1,000 hours to less than 10,000 hours. The design life expectancy of a typical hard disk drive system, in stark contrast, is stated at 5 years or 43,800 hours. It can be immediately appreciated that extending the life expectancy of MR transducer elements or stripes for use in disk drive applications is imperative if reasonably long disk drive life expectancies are to be achieved.

Many disk drive systems are employed in applications in which instantaneous access to stored data is a requirement. Disk drive systems used in network servers represent one such application. In a typical server-type application, the disk drive systems may remain inactive for extended periods of time during which reading, writing, and seeking operations are not performed. Notwithstanding such extended periods of disk drive system idleness, the disk drive systems must remain in a state of readiness in order to provide for the instantaneous access to data stored thereon.

In order to provide for instantaneous access to data stored in conventional disk drive systems that employ MR transducers, the MR elements are maintained in a ready-for-use state. As such, a bias current is supplied to a selected head on a continuous basis during normal operation and periods of extended disk drive system inactivity. It has been found that deleterious electromigration occurring within an MR element is accelerated in response to the higher temperatures/currents associated with biasing the MR element for instantaneous usage during active and inactive periods.

It is understood that disk drive systems used in server-type applications, as well as in many other applications, are typically designed to provide for a long service life. It can be appreciated that maintaining a disk drive system in a continuous state of readiness during extended periods of idleness can significantly reduce the operating life of the disk drive system and, in particular, the MR elements employed in the read/write heads of the system.

There exists a keenly felt need in the disk drive system manufacturing community for an apparatus and method for extending the life expectancy of a hard disk drive system in the field. There exists a particular need for an apparatus and method for extending the service life of an MR element incorporated in a read/write head. The present invention fulfills these and other needs.

SUMMARY OF THE INVENTION

The present invention is directed to an apparatus and method for extending the service life of an MR element incorporated in a read/write head. A method of extending the service life of an MR element provided on a read/write head of a hard disk drive system according to the present invention involves detecting periods of inactivity of the disk drive system and selectively switching between the heads for purposes of reading servo information during the periods of disk drive system inactivity.

Switching between heads may involve selecting each of the heads for reading servo information during one or more periods of disk drive system inactivity or selecting each of the heads in sequence during a respective period of disk drive system inactivity. Selecting between heads may also involve selecting a head having a minimum of usage. Head usage may be determined based on, for example, operating time data or energy dissipation data associated with each of the heads.

Other head characteristics, such as head or MR element wear, may also be used to select a head with minimal usage. A head having an MR element with a minimum of cumulative operational use or cumulative energy dissipation relative to other MR elements provided in the disk drive system may be selected as the head with a minimum of usage. Selecting between heads may further include selectively activating each of the heads for reading servo information for a predetermined duration of time during one or more periods of disk drive system inactivity.

Another aspect of the present invention concerns an apparatus provided in a disk drive system for extending the service life of an MR transducer. The apparatus includes a data storage disk, a number of data transfer heads, an MR element provided on each of the heads, an actuator for providing relative movement between the heads and the disk, and a processor that selectively activates each of the heads for purposes of reading servo information during one or more periods of disk drive system inactivity. The processor may selectively activate each of the heads in sequence or, alternatively, out of sequence during one or more periods of disk drive system idleness.

A timer may be utilized to produce signals upon expiration of a pre-established duration of time, such that the processor selectively activates each of the heads for purposes of reading the servo information during system idleness in response to respective ones of the expiration signals. A memory may be coupled to the processor and used to store usage parameters associated with each of the heads. The processor may select a particular head having a minimum of operating time or energy dissipation for activation during disk drive idleness as determined using the usage parameters stored in the memory.

In accordance with another embodiment of the present invention, a method of extending the service life of an MR element provided on a read/write head of a hard disk drive system involves moving the read/write head to a target location over a surface of a data storage disk, and reducing, during a period of disk drive system idleness, the rate at which the MR element reads servo information from the disk surface so as to reduce usage of the MR element during the idle period. Reducing the rate at which the MR element reads servo information from the disk surface involves reducing the rate from a nominal number of servo samples per disk revolution associated with nominal operation to a reduced number of servo samples per disk revolution.

The rate at which the MR element reads servo information during a portion of the idle period may, for example, be reduced to one servo sample per disk revolution. The rate at which the MR element reads servo information from the disk surface may, by way of further example, be reduced by greater than approximately 98% relative to the nominal servo sampling rate.

Another embodiment of a method of extending the service life of a number of MR elements provided on a multiplicity of read/write heads involves moving the heads to a target location over a surface of a data storage disk. During a period of disk drive system inactivity, the rate at which a selected MR element reads servo information from the disk surface is reduced from a nominal servo sampling rate to a reduced servo sampling rate. The MR elements are selectively activated during idle periods so as to further reduce usage of the MR elements. The servo sampling rate of a selectively activated MR element is increased from the reduced servo sampling rate to the nominal servo sampling rate in response to a disk drive command signal.

In accordance with a further embodiment of the present invention, an apparatus is provided in a disk drive system for extending the service life of a read/write head. The apparatus includes a data storage disk, a number of data transfer heads, an MR element provided on each of the read/write heads, and an actuator that provides for relative movement between the heads and the disk. A processor controls the sampling rate of servo information derived from the disk using the MR elements. During a period of disk drive system inactivity, the processor moves the actuator to a target position, such as a position at which head-to-disk clearance is at a maximum.

The processor then activates a selected one of the MR transducers and reduces the servo sampling rate of the selected transducer from a nominal number of servo samples per disk revolution to a reduced number of servo samples per disk revolution so as to reduce usage of the MR elements during the idle period. Selected ones of the MR transducers may be activated during subsequent periods of disk drive system inactivity. The processor may initiate reduction of the servo sampling rate upon expiration of a predetermined duration of time subsequent to the start of the idle period. Reducing the servo sampling rate of a selected MR element in combination with switching between MR elements in a multiple-head disk drive system significantly reduces the cumulative time during which a particular MR element is operating.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A low head usage system and methodology in accordance with the principles of the present invention provides for a dramatically longer MR transducer operating life. The low head usage system and methodology of the present invention may be implemented using existing components of a disk drive system, thereby requiring no additional hardware. As such, the low head usage methodology of the present invention may be implemented in existing and new disk drive system designs, with simple modifications being made only to the software of the disk drive system. Further, software embodying the low head usage methodology of the present invention may be downloaded into in-service disk drive systems or stored in a protected portion of memory and subsequently activated in the field in response to an activation code, for example.

In broad and general terms, the operating lives of MR elements incorporated in read/write heads of a disk drive system are significantly extended by reducing the overall usage of the MR elements. In one embodiment, the read/write heads of a disk drive system are switched during periods of disk drive system inactivity for purposes of reading servo information. Individual heads may be switched during one or more periods of disk drive system inactivity, typically, but not necessarily, in sequential order.

Individual heads may alternatively be selected for use during system idleness based on the cumulative operating time associated with each of the read/write heads or, more particularly, each of the MR elements. Switching between heads may also be based on the total energy dissipated by each of the MR elements. The degree to which MR element service life may be extended is typically dependent on the number of MR elements provided in a disk drive system. In typical multi-head disk drive systems, for example, MR stripe service lives may be extended on the order of ten to twenty fold.

An alternative low head usage methodology according to the present invention involves the reduction in the rate at which servo information is sampled using an MR transducer during periods of disk drive system idleness. In one embodiment, for example, the servo sampling rate of a particular MR transducer is reduced from a nominal number of samples per revolution of the data storage disk to a single servo sample per disk revolution during a period of disk drive system idleness. In a disk drive configuration employing multiple MR transducers, particular MR transducers are selectively activated for purposes of reading servo information during one or more idle periods of the disk drive system.

Figure 1:
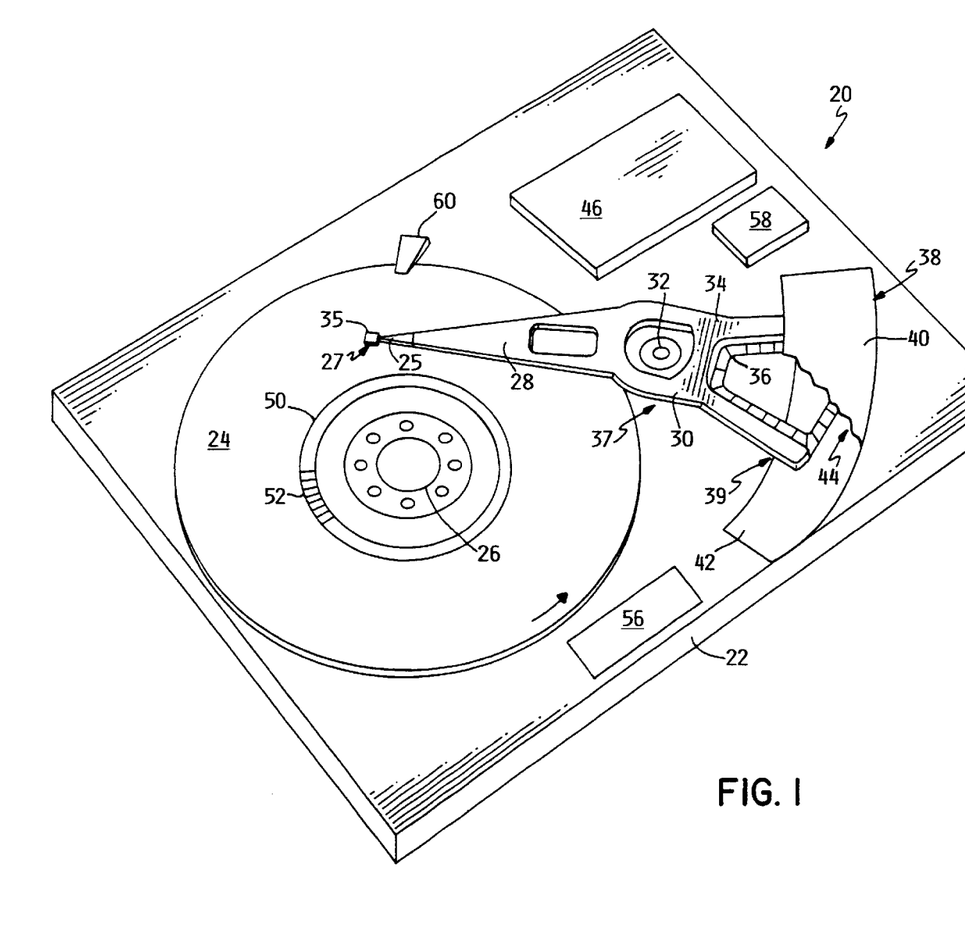
FIG. 1 is a top perspective view of a disk drive system with its upper housing cover removed.
Figure 2:
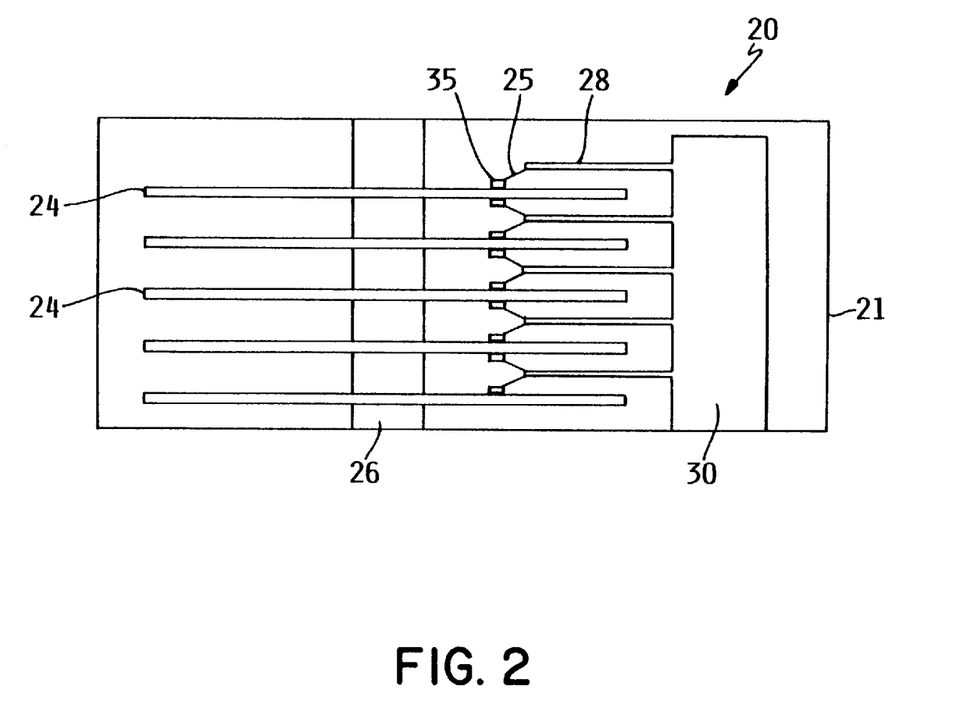
FIG. 2 is a side plan view of a disk drive system comprising a plurality of data storage disks.

Referring to the drawings, and more particularly to FIGS. 1 and 2, there is illustrated a disk drive system 20 within which the low head usage methodology of the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation. As is depicted in FIG. 1, each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiraled track configuration.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an air bearing produced by high speed of rotation of the disk 24. A conformal lubricant may alternatively be disposed on the disk surface 24 to reduce static and dynamic friction between the slider 35 and the disk surface 24.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a polyphase AC motor or, alternatively, a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The servo processor 56 regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted in the Figures as two separate devices, it is understood that the functionality of the servo processor 56 and disk drive controller 58 may be embodied in a single multi-purpose processor, which typically results in a reduced component cost.

Figure 3A:
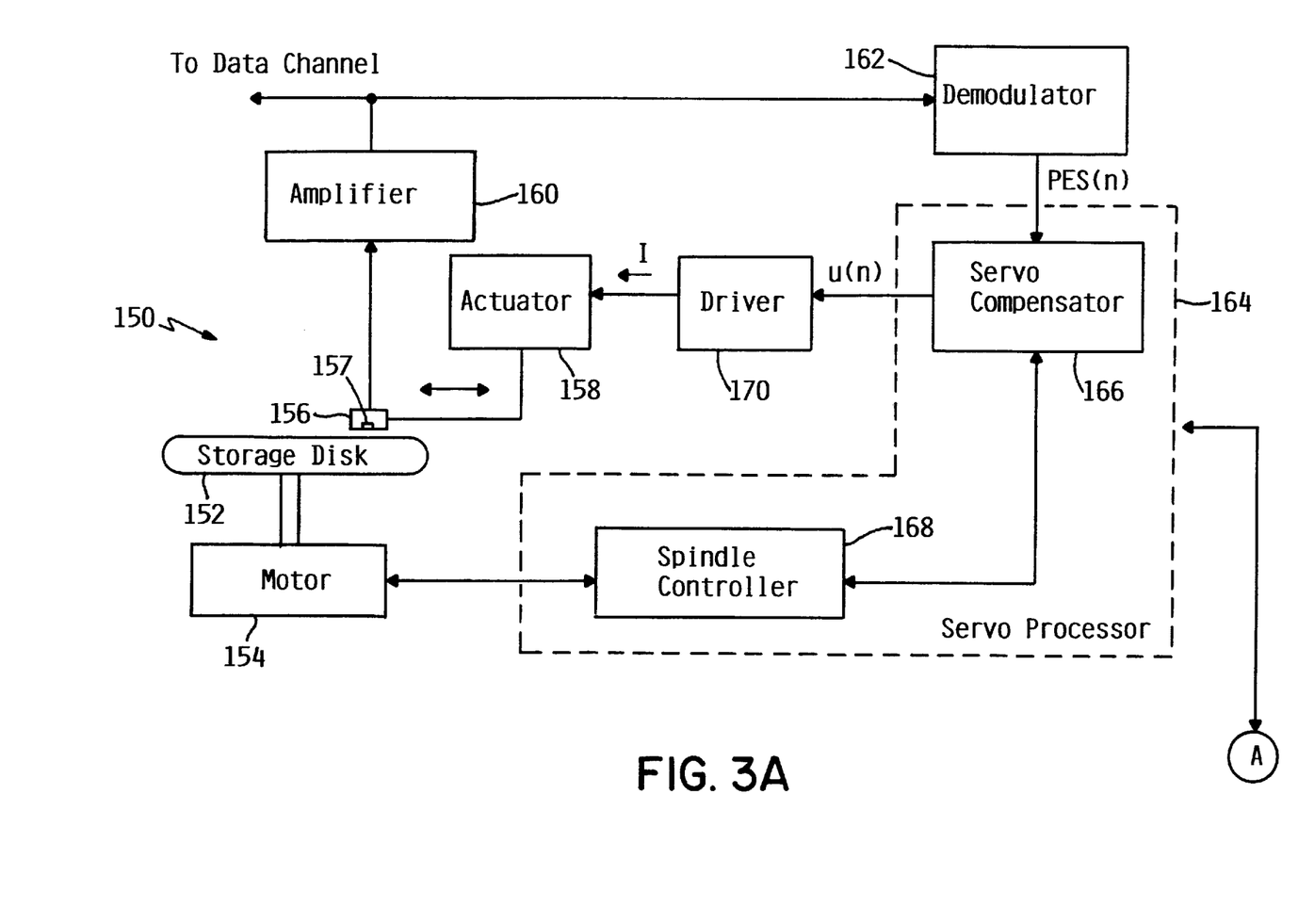
FIG. 3 is a block diagram of an embodiment of a read/write head positioning control apparatus of a disk drive system well suited for implementing a low head usage procedure according to the present invention.
Figure 3B:
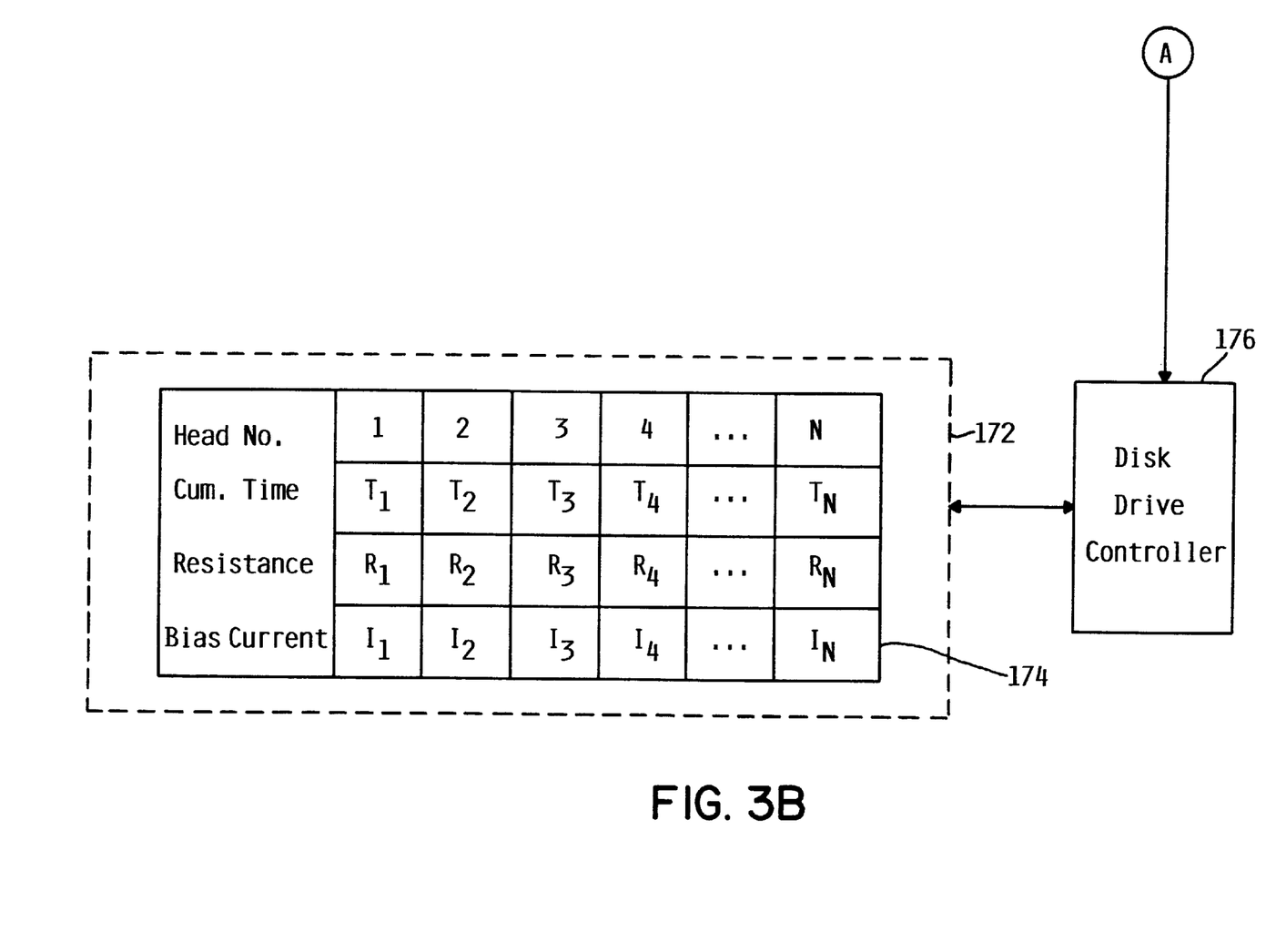

In FIG. 3, there is illustrated a system block diagram showing several components of a system 150 for positioning one or more read/write heads over specified locations of a data storage disk surface during normal operation and for performing a reduced head usage procedure in accordance with the principles of the present invention. A read/write head 156, which includes an MR read element 157, is shown positioned above a data storage disk 152. An actuator 158, in response to current control signals, I, produced by a driver 170 during normal operation, moves the read/write head 156 to prescribed track and sector locations when transferring data to and from the data storage disk 152. A motor 154 rotates the disk 152 at a prescribed rate in response to motor control signals produced by a spindle controller 168 of a servo processor 164.

Signals read from a servo pattern embedded or otherwise provided on the disk 152 using the MR element 157 of the read/write head 156 are transmitted to an amplifier 160. The servo signals are then transmitted from the amplifier 160 to a demodulator 162 and to a data channel. The demodulator 162 computes an instantaneous position error signal using the servo signals received from amplifier 160, and produces and output signal, PES(n), where n represents the sector index. A servo compensator 166 of the servo processor 164 uses the PES(n) signal in a servo algorithm to produce a control signal, u(n), which is converted to a control current, I, by the driver 170. The actuator 158, in response to the control current, I, moves the read/write head 156 to a specified location above the disk 152.

The system 150 shown in FIG. 3 further includes a memory 172 coupled to the disk drive controller 176. The memory 172, although depicted as a component separate from the disk drive controller 176, may be provided within the disk drive controller 176. The memory 172 may be configured to include a table or array 174 within which operating time parameters associated with each of the read/write heads 156, the MR elements 157, or both the heads 156 and MR elements 157 of a multi-head disk drive system may be stored. For example, the cumulative operating time for each of the read/write heads 156 or, more preferably, each of the MR elements 157 installed in a disk drive system at build time may be stored.

If a particular read/write head 156 or MR element 157 requires replacement during the service life of the disk drive system, the table 174 would be updated to reflect such a change. For example, the cumulative operating time for a newly installed MR element 157 would be set to zero or a quantity of time reflective of actual operating time to date for the MR element. It is understood that other information associated with the MR elements 157 and read/write heads 156 may be stored in the table 174 or other location in the memory 172, such as identification information or operating characteristics data associated with each of the MR elements 157 or read/write heads 156.

For example, the table 174 supported in memory 172 may also store energy dissipation parameters associated with each of the read/write heads 156 or MR elements 157 provided in the disk drive system. As is depicted in FIG. 3, resistance and bias current values associated with each of the MR elements 157 may be stored in the table 174. Read/write head #1, for example, may have a cumulative operating time, $T_1$, that is comparable to that, $T_4$, of read/write head #4. The resistances, $R_1$ and $R_4$, and bias currents, $I_1$ and $I_4$, of the two heads, #1 and #4, may, however, vary significantly. The resistance and bias current parameters stored in the table 174 provide for the computation of cumulative energy dissipated by each of the MR elements 157. Cumulative dissipated energy may provide for enhanced accuracy when performing head selection based on minimal usage.

Figure 4:
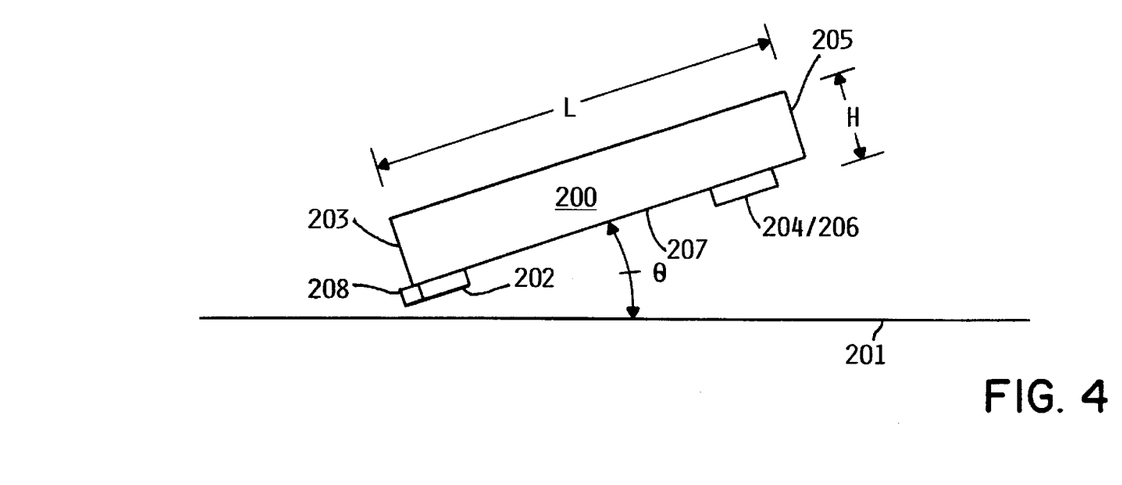
FIG. 4 is a side plan view of a generic air bearing slider having at least one transducer element mounted toward the trailing edge of the slider.
Figure 5:
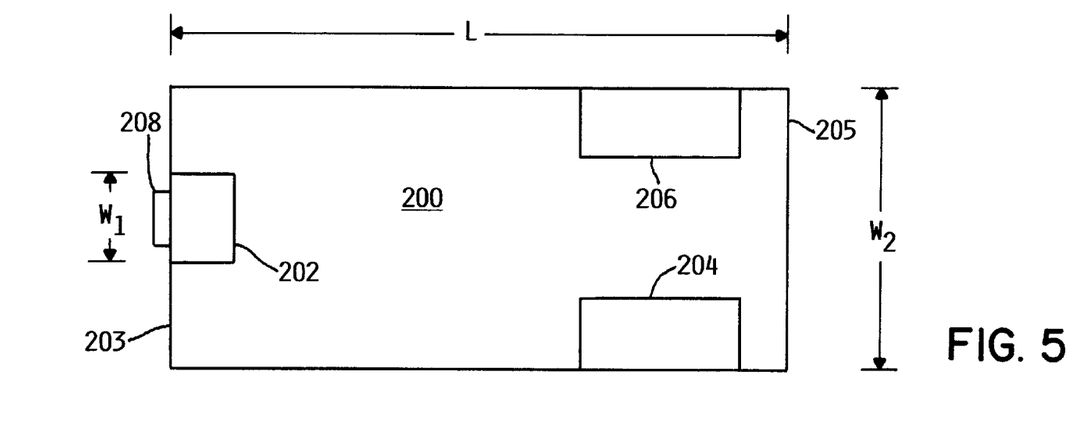
FIG. 5 is a bottom plan view of the slider shown in FIG. 4.

FIG. 4 is an exaggerated side plan view of an air bearing slider 200 having an MR transducer element 208 mounted toward the trailing edge 203 of the slider 200. FIG. 5 is a bottom plan view of the slider shown in FIG. 4. The air bearing slider 200 shown in FIGS. 4 and 5 is intended to represent a generic slider configuration which includes at least one MR stripe 208 for purposes of illustration. No particular flying characteristics or attributes are intended to be suggested or implied in FIGS. 4 and 5.

In the configuration shown in FIGS. 4 and 5, the air bearing slider 200 includes a leading edge 205 and a trailing edge 203. A pair of front air bearing surfaces or pads 204, 206 are disposed on a lower surface 207 of the slider 200. The front air bearing pads 204, 206 are positioned toward the leading edge 205 and along opposing sides of the slider 200. Positioned toward the trailing edge 203 of the slider 200 and centered along the longitudinal axis of the slider 200 is a rear air bearing surface 202. One or more transducers 208 are mounted behind the rear air bearing surface 202.

The air bearing slider 200 depicted in FIGS. 4 and 5 has a length (L) of approximately 3 mm, a height (H) of approximately 0.5 mm, and a width ($W_2$) of approximately 2.5 mm The width ($W_1$) of the rear air bearing surface 202 is approximately 0.3 mm. The air bearing slider 200 is oriented such that its lower surface 207 has a mean positive lateral pitch angle, $\theta$, of approximately 0.2 to $0.3 \times 10^{-3}$ radians with respect to the surface 201 of the data storage disk.

Figure 10:
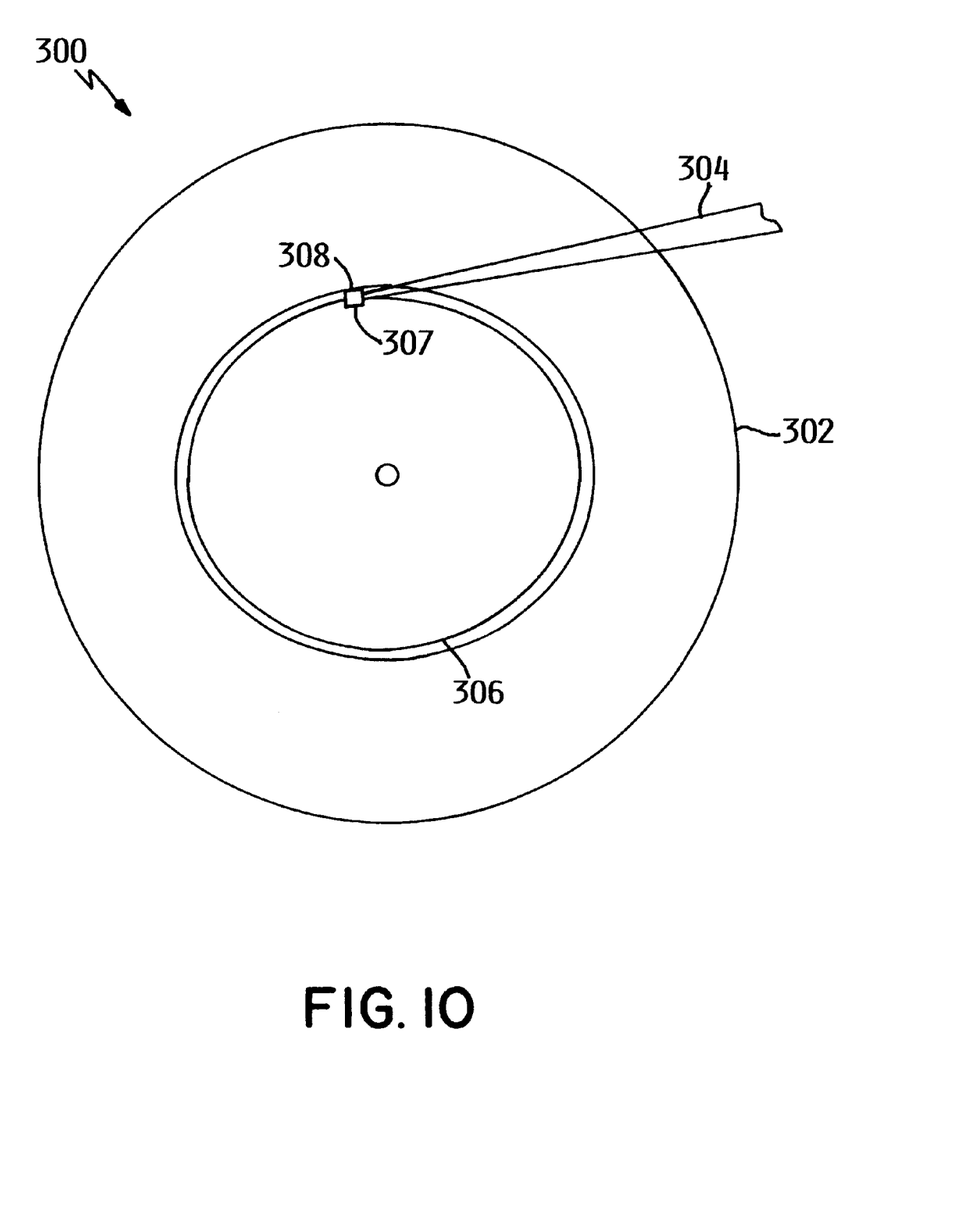
FIG. 10 is an exaggerated depiction of a read/write head disposed on an actuator arm and positioned at a target location above the surface of a data storage disk for performing a low head usage procedure according to the present invention.

As is best shown in FIG. 10, an MR element 307 provided on a read/write head 308 is used to read servo information embedded or otherwise disposed on data storage disk 302 at a nominal sampling rate. By way of example, a data storage disk 302 may be formatted to include 90 servo sectors in accordance with a conventional embedded servo writing process. A nominal servo sampling rate for such a disk would be 90 servo samples per revolution of the disk. By way of further example, a nominal servo sampling rate for a disk formatted to include 68 servo sectors would be 68 servo samples per revolution of the disk.

In general, changes in the magnetic signal read by the MR element 307, often termed a magnetic readback signal, result from changes in the resistance of the MR element 307. More particularly, a typical MR element, which acts as a resistor that is sensitive to the presence of magnetic fields, is electrically coupled to a current source between positive and negative element leads. A bias current is applied to the MR element 307 via the leads. In normal operation, magnetic transitions on the surface of the disk 302 affect the resistance of the MR element 307 giving rise to voltage variations across the MR element 307. These voltage changes occur at the frequency of the magnetic data transitions recorded on the disk surface.

It can be appreciated that long-term, continuous application of bias current to an MR element 307 reduces the expected and actual operating life of the MR element 307. Under typical operating conditions, for example, an MR element 307 is subject to bias currents ranging between approximately 10 mA and 17 mA, and temperatures ranging between approximately 50° C. to 100° C. As was previously mentioned, deleterious electromigration occurring within the MR element is accelerated in response to the higher temperatures/currents associated with biasing the MR element for instantaneous, continuous usage.

The system 150 shown in FIG. 3, or other appropriate control system as is known in the art, may implement the generalized process steps depicted in FIGS. 6–9 when performing a low head usage procedure according to the present invention. FIGS. 6–9 respectively depict four particular embodiments of a low head usage methodology in accordance with the present invention, each of which may be advantageously employed to significantly extend the service life of MR transducers provided in a disk drive system.

Figure 6:
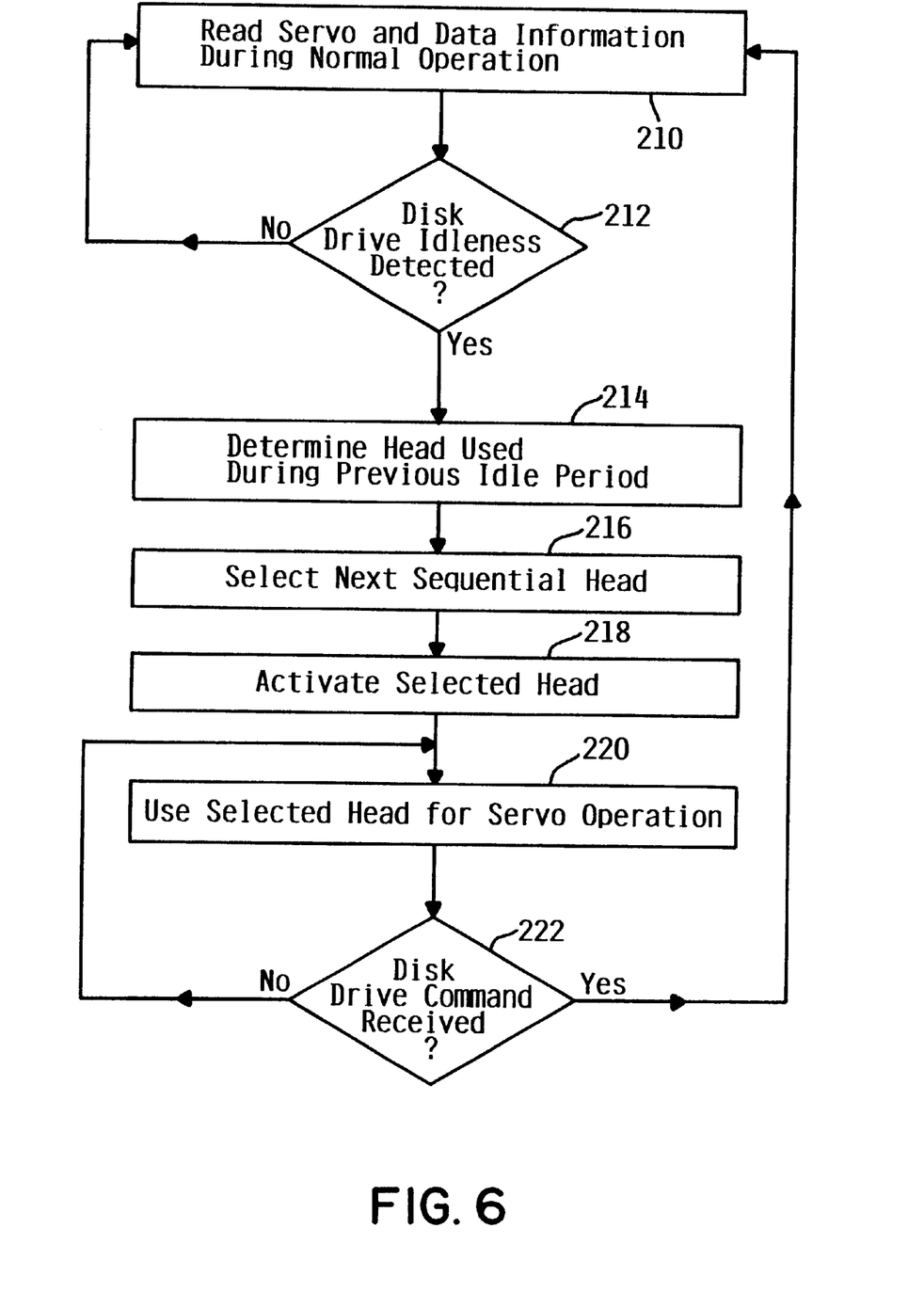
FIGS. 6–9 are flow diagrams illustrating various process steps implemented during a low head usage procedure in accordance with several embodiments of the present invention.

In accordance with the embodiment depicted in FIG. 6, servo and data information is read 210 from the disk using a selected read/write head during normal disk drive system operation. If the disk drive system remains inactive or idle 212 (e.g., no reading, writing, or seeking operations occurring) for a specified period of time, such as 5 seconds for example, a low head usage procedure is initiated. Otherwise, the selected MR transducer continues to read 210 servo information during normal operation of the disk drive system.

A low head usage procedure is initiated upon detection of system idleness by selectively activating particular heads for purposes of reading only servo information from the disk surface during one or more idle periods. In one embodiment, a head switch is performed by which the head used for servo operations prior to the idle period is deactivated and the next sequentially identified head is activated 216, 218. For example, head #6 may be deactivated upon detection of a system idle period 212, and head #7 may be activated 216, 218 for purposes of reading servo information during the idle period.

Alternatively, the head used during a previous low head usage procedure may be determined 214, and the next sequential head may be used for purposes of reading servo information during a subsequent idle period. A bias current may be supplied to the MR element of a selected head on a continuous basis during all or a portion of one or more idle periods. Alternatively, the bias current may be supplied prior to the MR element of a selected head encountering each, or a selected, servo sector and then removed thereafter. For example, bias current may be supplied to the MR element of a selected head approximately 1 microsecond prior to encountering a servo sector and removed after passing beyond the servo sector.

The selected head may be used 220 for servo operations during the entire idle period until such time as a disk drive command is received 222. In response to a disk drive command, such as a data transfer command or other command that causes the system to terminate idle mode operation, the low head usage procedure is terminated and normal servo/data transfer operations continue 210. It is understood that a head that is performing marginally may be included or excluded from the head selection process. For example, the disk drive controller typically stores operating information, such as error information, concerning each of the heads. A head that is identified as a marginal or poor performer may be excluded from consideration when head selection is performed during a low head usage procedure.

Figure 7:
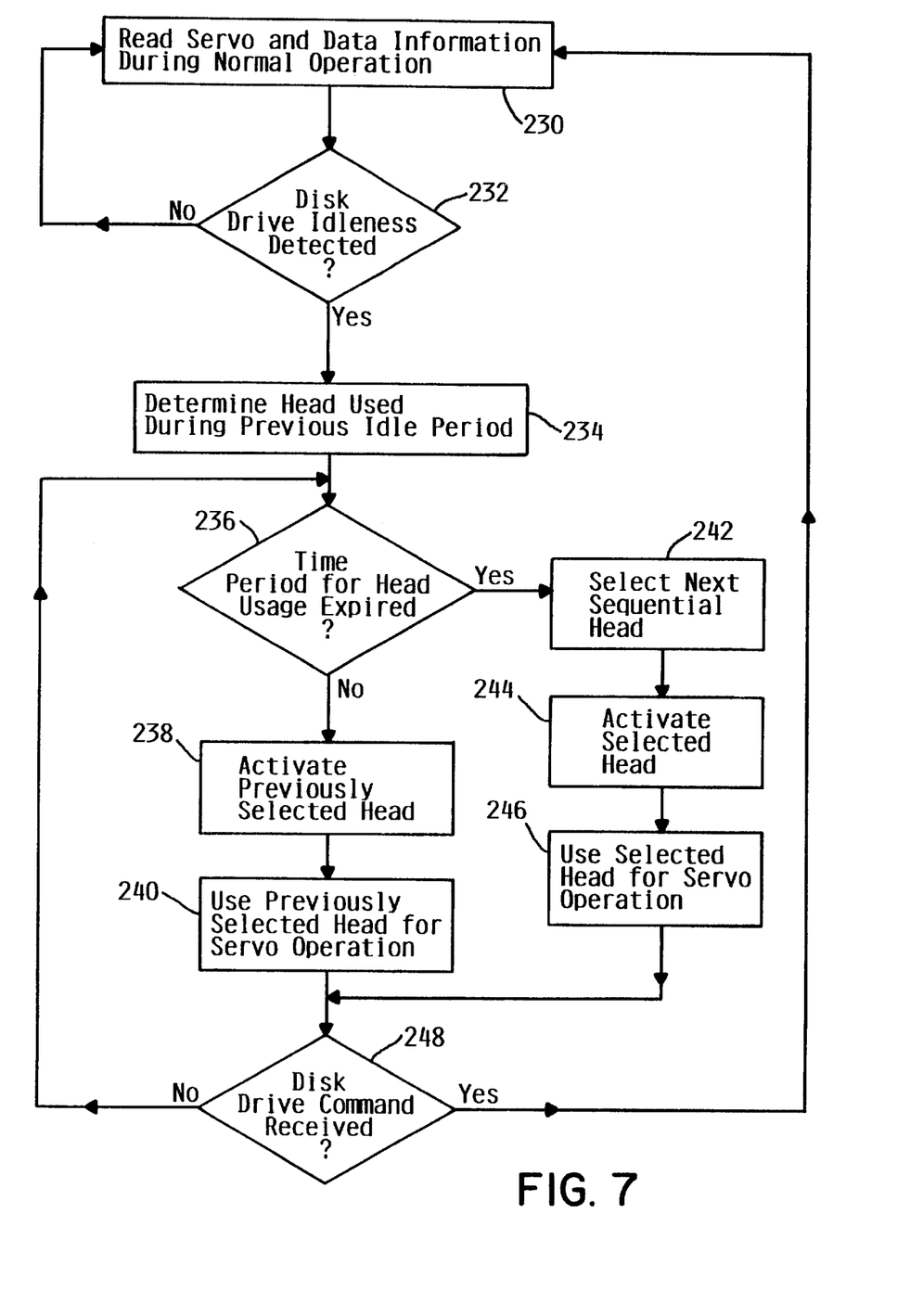

In accordance with the embodiment depicted in FIG. 7, normal servo operations continue 230 until such time as disk drive system inactivity is detected 232. The head used during normal servo and data transfer operations prior to system idleness or, alternatively, the head last used during a previous low head usage procedure, may be used a basis for determining which head is to be used during the instant low head usage procedure. In the embodiment shown in FIG. 7, a timer is used to generate an expiration signal upon elapse of a pre-established time duration, such as predetermined number of seconds, minutes, hours, or days for example. After generating the expiration signal, the timer is reset and begins counting up or down until the pre-established time duration is exhausted, at which time another expiration signal is generated. This timer operation is repeated during execution of a low head usage procedure depicted in FIG. 7.

At the initiation of a low head usage procedure, it is likely that a portion of the pre-established time period associated with a previously executed low head usage procedure may not have been fully exhausted. If such is the case 236, the previously used head (e.g., head #2) is activated 238 and used 240 for servo operations for the remaining duration of the timer period. Upon expiration of the timer period and generation of an expiration signal, the next sequential head (e.g., head #3) is selected 242, activated 244, and used 246 for servo operations during the idle period.

Assuming that the idle period continues, a disk command has not been received 248, and the timer generates another expiration signal, the next sequential head (e.g., head #4) is selected 242, activated 244, and used 246 for purposes of reading servo information during the continuing period of disk drive system inactivity. It can be seen that the low head usage embodiment depicted in FIG. 7 provides for limiting the overuse of a single read/write head or MR element during one or more periods of extended system idleness.

Figure 8:
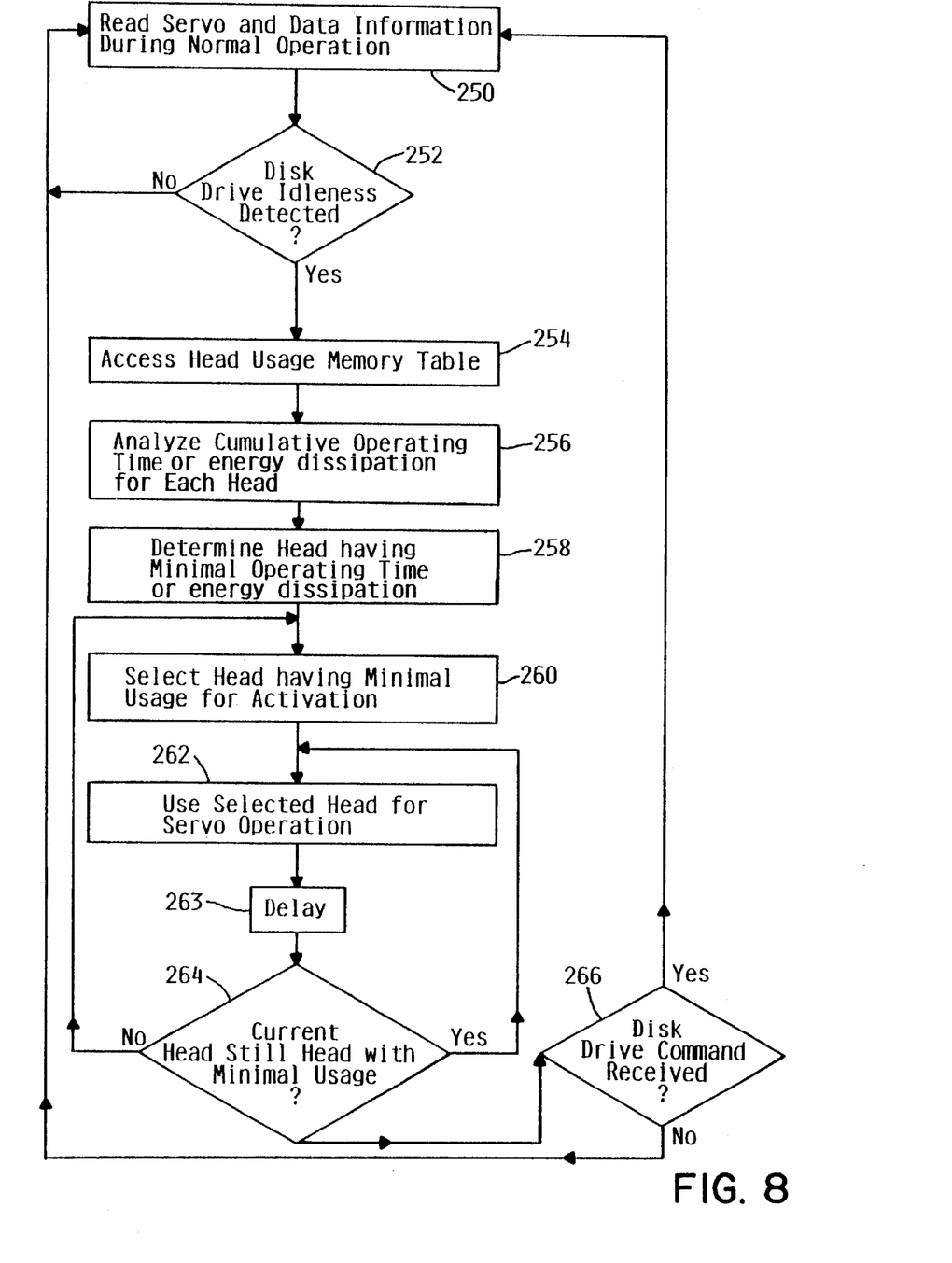

FIG. 8 depicts generalized process steps that implement a low head usage procedure in accordance with another embodiment of the present invention. After detection 252 of disk drive idleness, a memory that stores information concerning head/MR element usage is utilized for purposes of determining which head is to be used for servo operations during the low head usage procedure. The memory 172 shown in FIG. 3, for example, includes a table 174 that contains usage information, such as operating time and energy dissipation data, associated with each of the heads or MR elements provided in the disk drive system.

Upon detecting disk drive system inactivity 252, the head usage memory table is accessed 254 and the cumulative operating time for each of the heads is analyzed 256. Minimal head usage may also be determined based on additional data stored in the head usage memory table, such as cumulative energy dissipated by each of the heads. The head having a minimum of usage is determined 258 and selected 260 for use 262 during the idle period. During the low head usage procedure, the disk drive controller processor may make additional periodic comparisons between the head usage data stored in the memory and the current usage data associated with the head presently in use.

If the head presently in use is determined 264 to be the head with minimal usage, this head remains active. If, during the low head usage procedure, a head other than the presently used head is determined 264 to be the head with minimal usage, a head switch is performed so as to activate the minimally used head during the period of continued system idleness. A delay 263 between head selection and usage determination operations 260, 262, 264 may be included to avoid rapid switching between heads. The disk drive controller may perform repeated comparison operations during a low head usage procedure in order to identify and activate a head with minimal usage. Receipt of a disk drive command 266 terminates the low head usage procedure.

It can be appreciated that the low head usage methodology depicted in FIG. 8 provides an accurate assessment of cumulative head/MR element usage, and provides for the distribution of head utilization across all read/write heads so as to prevent a single read/write head from being overused relative to other read/write heads in the same disk drive system.

Figure 9:
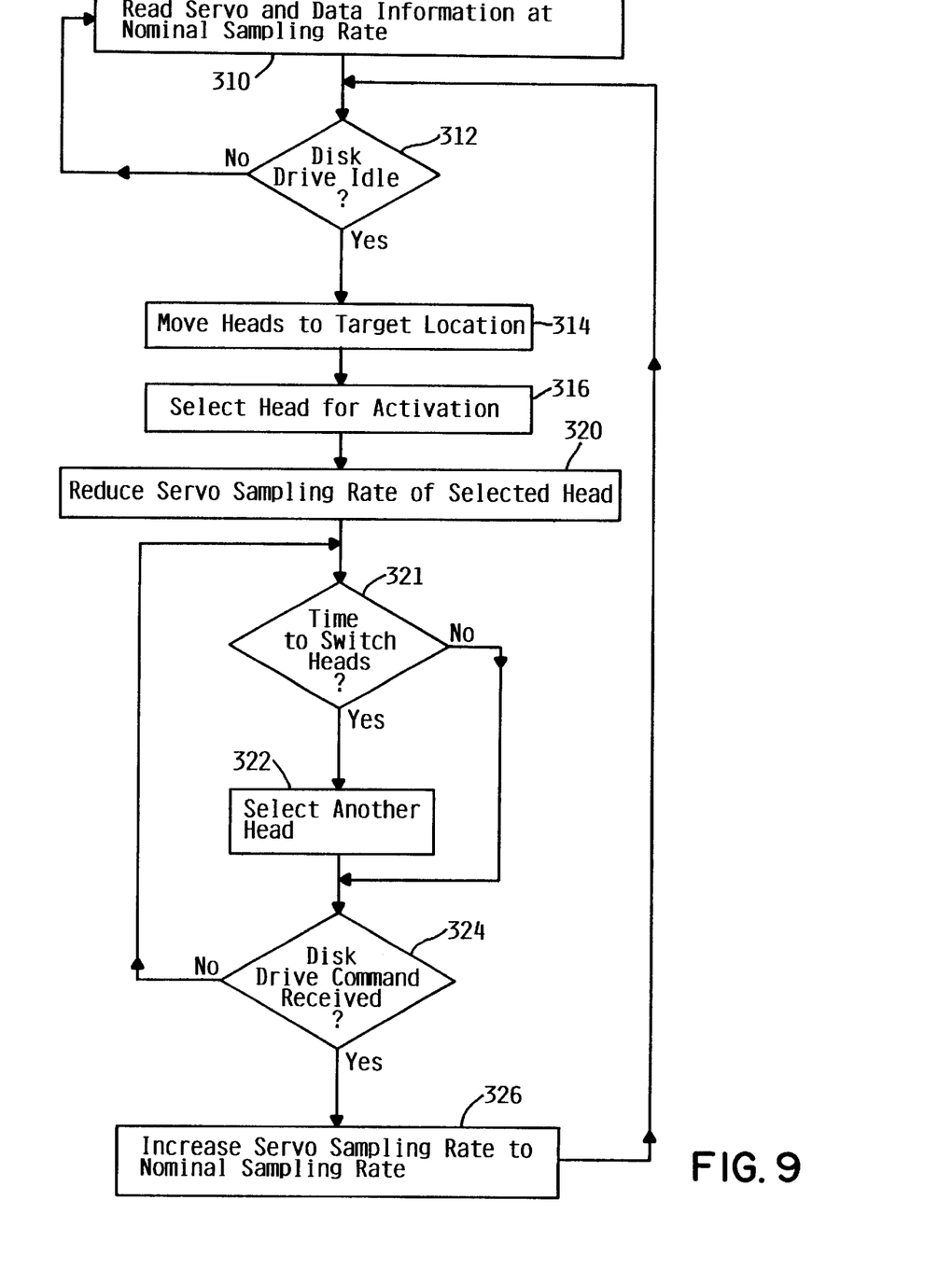

FIG. 9 illustrates another embodiment of a low head usage methodology according to the present invention. During normal disk drive system operations, servo and data information is read 310 from the disk 302 at a nominal sampling rate, such as 68 or 90 servo samples per disk revolution. If the disk drive system remains inactive or idle 312 for a specified period of time, a low head usage procedure according to steps depicted in FIG. 9 is initiated. Otherwise, the MR transducers continue to read 310 servo information at the nominal sampling rate.

As is further depicted in FIGS. 9 and 10, the servo processor, upon initiation of a low head usage procedure, moves the read/write head(s) 308 to a target radius 306 of the disk 302. The target radius 306 typically represents a position of the read/write heads 308 at which head-to-disk clearance is at a maximum, such as an inner diameter disk location, a middle diameter disk location, or other disk location as may be appropriate given a particular disk configuration or design.

The disk drive controller selects 316 one of the read/write heads 308 for purposes of providing servo information to the servo processor during the idle period. The disk drive controller activates the selected read/write head 308 and, in response to an idle mode command produced by the disk drive controller, the servo processor reduces 320 the servo sampling rate of the selected read/write head 308.

The reduced servo sampling rate may be any rate less than the nominal sampling rate, and is preferably 1 servo sample per disk revolution. The MR element of the selected read/write head 308 is active only during the time in which a servo sample is effected. For example, and assuming a reduced servo sampling rate of 1 servo sample per disk revolution, bias current is supplied to the MR element only for a period of time needed to effect a single servo sample per disk revolution.

The duty cycle improvement realized through employment of the low head usage procedure over conventional methods of sampling every servo sector burst may be characterized by the following relationship:

$$\frac{\text{Duty Cycle New}}{\text{Duty Cycle Old}} = \frac{\text{Reduced Number of Servo Samples}}{\text{Number of Servo Sectors}} \qquad [1]$$

For a disk drive system having data storage disks formatted to include 90 servo sectors, for example, and assuming that the reduced number of servo samples variable is 1, the new duty cycle given by Equation [1] above is approximately 99% less than that provided by the conventional method of sampling every servo sector. For a disk drive system having data storage disks formatted to include 68 servo sectors, by way of further example, and again assuming that the reduced number of servo samples variable is 1, the new duty cycle given by Equation [1] above is approximately 98.5% less than that provided by the conventional method of sampling every servo sector.

The disk drive controller may further coordinate switching 321, 322 between MR elements prior to initiating, or during, a particular low head usage procedure. The disk drive controller and servo processor may employ any of the previously described head switching techniques. In one embodiment, the disk drive controller selects a particular read/write head 308 for purposes of providing servo information at a reduced sampling rate during a first period of disk drive system inactivity. The particular read/write head 308 is used to provide servo information to the servo processor during subsequent periods of disk drive system idleness until a pre-established time limit has expired. The time limit may, for example, be specified in terms of minutes, hours, or days.

Upon expiration of the time limit associated with a particular read/write head 308, the disk drive controller selects the next sequential read/write head 308 for providing servo information during subsequent idle periods. This methodology may be enhanced by recording in a memory coupled to the disk drive controller, such as memory 172 coupled to disk drive controller 176 shown in FIG. 3, the identity of the read/write head utilized during the most recent idle period, and selecting the next sequential read/write head during the next idle period.

In accordance with another embodiment, a table supported in memory may be used to account for the total cumulative time each read/write head has been selected for use during normal operation and, in particular, during low head usage procedures. Upon initiating subsequent low head usage procedures, the disk drive controller may select the read/write head that has seen the least amount of cumulative use, rather than selecting the next sequential read/write head.

Alternatively, the energy dissipated by the MR elements of the heads may be used as a basis for determining which of the heads has the greatest cumulative usage. Due to variances in resistances and bias currents across a number of MR elements provided in a particular disk drive system, determining usage based on MR element energy dissipation provides for enhanced accuracy when selecting the head/MR element with minimal usage. The resistance, bias current, and operating time information stored in the head usage memory table, such as table 174 supported in memory 172 shown in FIG. 3, may be used by the disk drive controller to compute the cumulative energy dissipated by each of the MR elements. Equation [2] below may be used by the disk drive controller when calculating the energy dissipated by the MR elements:

$$E_j = I^2_j \cdot R_j \cdot T_j \qquad [2]$$

where, $E_j$ represents the energy dissipated by the jth MR element, $I^2_j$ represents the bias current squared of the jth MR element, $R_j$ represents the resistance of the jth MR element, and $T_j$ represents the cumulative operating time of the jth MR element. Energy dissipation computations may be made for each of the MR elements by the disk drive controller when selecting an MR element with minimal usage during a low head usage procedure. It is understood that energy dissipation and cumulative operating time represent exemplary head/MR element characteristics that may be useful in determining head usage, but do not represent an exhaustive list of useful head/MR element usage parameters. Other characteristics, such as wear or abrasion, may also be used to determined head usage.

For purposes of further enhancing accuracy, a number of energy dissipation computations may be made for each MR element over time, such as one computation per hour. Each computation may be added to a total energy consumption register associated with each MR element. Alternatively, energy dissipation computations may be made when the resistance, R, or bias current, I, for a particular MR element varies beyond a pre-established threshold.

It has been observed, for example, that the resistance of an MR element may change over the operating life of a head or disk drive system. Abrasion of the MR element, for example, alters the configuration of the MR element, such as by altering the cross sectional area of the MR element, which results in a change in MR element resistance. To accommodate such changes in MR element resistance, the bias current supplied to an MR element may be altered over the life of the head/disk drive system. Adjustment of MR element bias current may be made in the field by a technician or in-situ the disk drive system during a self-calibration procedure. It can be appreciated that monitoring the energy dissipated by each of the heads/MR elements of a disk drive system provides for enhanced selectivity when switching between heads during a low head usage procedure in accordance with the present invention.

These and other methods that will be apparent to one skilled in the art distribute the head select time across all read/write heads, thereby preventing a single read/write head from acquiring an abnormally high number of service hours relative to other read/write heads in the same disk drive system.

If a data transfer command, such as a read, write, or seek command, is received 324 by the servo processor, the servo sampling rate of the read/write head(s) 308 is increased 326 to the nominal sampling rate. The low head usage procedure is repeated upon the next occurrence 312 of disk drive system idleness.

The low head usage methodology of the present invention, as previously discussed, requires no additional hardware to implement in existing and future disk drive systems. The servo processor software may be modified to effect the process steps described with respect to the embodiment depicted in FIGS. 6–9. A low head usage methodology according to the present invention may thus be effected, for example, by the controller implementing a sequence of machine-readable instructions. These instructions may reside in various types of signal-bearing media.

In this respect, another embodiment of the present invention concerns a programmed product which includes a signal-bearing medium embodying a program of machine-readable instructions, executable by a digital processor to perform method steps to effect a low head usage procedure. The signal-bearing media may include, for example, random access memory (RAM) provided within, or otherwise coupled to, the servo processor or arm electronics module.

Alternatively, the instructions may be contained in other signal-bearing media, such as one or more magnetic data storage diskettes, direct access data storage disks (e.g., a conventional hard drive or a RAID array), magnetic tape, alterable or non-alterable electronic read-only memory (e.g., EEPROM, ROM), flash memory, optical storage devices (e.g., CDROM or WORM), signal-bearing media including transmission media such as digital, analog, and communication links and wireless, and propagated signal media. In an illustrative embodiment, the machine-readable instructions may constitute lines of compiled "C" language code or "C++" object-oriented code.

Software embodying a low head usage methodology according to the present invention may be stored in a protected region in system memory, and subsequently activated in response to an activation code. A user, for example, may be provided with such a code after payment of an activation fee or the code may be downloaded remotely by a technician. Alternatively, the low head usage software may be uploaded to a disk drive system in the field.

Implementing a low head usage methodology according to the present invention significantly extends the operating life of MR transducers employed in a disk drive system. Accordingly, the probability that a single read/write head may exceed the expected MR stripe operating life is dramatically reduced. The probability that an MR stripe will exceed the expected operating life of the disk drive system is also greatly reduced.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of extending a service life of a plurality of magnetoresistive (MR) elements provided on a plurality of read/write heads disposed in a disk drive system, comprising:

providing energy dissipation data associated with each of the heads;

detecting periods of inactivity of the disk drive system during which no data reading, data writing, or seeking operations occur; and selecting between the heads for reading servo information during the periods of disk drive system inactivity based on the energy dissipation data.

2. The method according to claim 1, further comprising supplying a bias current to each selected head prior to the selected head encountering the servo information, and removing the bias current from each selected head after the selected head passes beyond the servo information.

3. The method according to claim 1, wherein selecting between the heads comprises selecting each of the heads in sequence for reading servo information during a respective period of disk drive system inactivity.

4. The method according to claim 1, wherein selecting between the heads comprises selecting between particular heads for reading servo information during one or more periods of disk drive system inactivity.

5. The method according to claim 1, wherein selecting between the heads comprises selecting a head having a minimum of energy dissipation.

6. The method according to claim 1, wherein selecting between the heads comprises selecting a head having an MR element with a minimum of energy dissipation relative to other ones of the plurality of MR elements.

7. The method according to claim 1, wherein selecting between the heads comprises determining a cumulative amount of energy dissipation associated with each of the heads.

8. The method according to claim 1, wherein selecting between the heads comprises determining a cumulative amount of energy dissipation associated with each of the MR elements.

9. The method according to claim 1, wherein selecting between the heads comprises:

reading stored energy dissipation data associated with each of the heads; and using the energy dissipation data to select a head having a minimum of usage for reading the servo information during the periods of disk drive system inactivity.

10. The method according to claim 1, wherein selecting between the heads comprises excluding from selection a head operating in an anomalous manner.

11. An apparatus provided in a disk drive system for extending a service life Data Transfer head, comprising:
    a data storage disk;
    a plurality of data transfer heads;
    an MR element provided on each of the heads;
    an actuator for providing relative movement between the heads and the disk;
    a memory for storing energy dissipation data for each of the heads; and
    a processor that selectively activates each of the heads for reading servo information during one or more periods of disk drive system inactivity in which no data reading, data writing, or seeking operations occur based on the energy dissipation data.

12. The apparatus of claim 11, wherein the processor selectively activates each of the heads in sequence for reading servo information during one or more periods of disk drive system inactivity.

13. The apparatus of claim 11, further comprising a timer that produces expiration signals upon expiration of a pre-established duration of time, wherein the processor selectively activates each of the heads for reading the servo information in response to respective ones of the expiration signals.

14. The apparatus of claim 11, wherein the processor selectively activates each of the heads out of sequence for reading the servo information.

15. The apparatus of claim 11, wherein the processor selects, using the energy dissipation data stored in the memory, a head having a minimum of energy dissipation for activation.

16. The apparatus of claim 11, wherein the processor selects, using the energy dissipation data stored in the memory, a head having an MR element with a minimum of energy dissipation for activation.

17. The apparatus of claim 11, wherein the processor excludes from selection an MR element operating in an anomalous manner.

18. A computer readable medium tangibly embodying a program executable for extending a service life of a plurality of magnetoresistive (MR) elements provided on a plurality of read/write heads of a disk drive system, comprising:
    providing energy dissipation data associated with each of the heads;
    detecting periods of inactivity of the disk drive system during which no data reading, data writing, or seeking operations occur; and
    selecting between the heads for reading servo information during the periods of disk drive system inactivity based on the energy dissipation data.

19. The medium of claim 18, wherein selecting between the heads comprises selecting each of the heads for reading servo information during one or more periods of disk drive system inactivity.

20. The medium of claim 18, wherein selecting between the heads comprises selecting a head having a minimum of energy dissipation.

21. The medium of claim 18, wherein selecting between the heads comprises selecting a head having an MR element with a minimum of energy dissipation relative to other ones of the plurality of MR elements.

22. The medium of claim 18, wherein selecting between the heads comprises determining a cumulative amount of energy dissipation associated with each of the MR elements and selecting a head having an MR element with a minimum of energy dissipation.

23. The medium of claim 18, wherein selecting between the heads comprises:
    reading stored energy dissipation data associated with each of the heads; and
    using the energy dissipation data to select a head having a minimum of energy dissipation for reading the servo information during the periods of disk drive system inactivity.

24. The medium of claim 18, further comprising supplying a bias current to each selected head prior to the selected head encountering the servo information, and removing the bias current from each selected head after the selected head passes beyond the servo information.

25. The medium of claim 18, wherein selecting between the heads comprises excluding from selection an MR element operating in an anomalous manner.

26. A method of extending a service life of a plurality of magnetoresistive (MR) elements provided on one or more read/write heads disposed in a disk drive system, comprising:
    detecting a period of disk drive system inactivity;
    selecting an MR element from the plurality of MR elements having a minimum of energy dissipation;
    activating, during the period of disk drive system inactivity, the selected MR element;
    moving the selected MR element to a target position of a disk surface; and
    reducing, during the inactive period, a rate at which the selected MR element reads servo information provided on the disk surface at the target position from a nominal servo sampling rate to a reduced servo sampling rate.

27. The method according to claim 26, wherein reducing the rate at which the selected MR element reads servo information comprises reducing the rate from a first number of servo samples per disk revolution associated with nominal operation to a second number of servo samples per disk revolution, the second number of servo samples per disk revolution being less than the first number of servo samples per disk revolution.

28. The method according to claim 26, wherein reducing the rate at which the selected MR element reads servo information comprises reducing the rate from a number of servo samples per disk revolution associated with nominal operation to one servo sample per disk revolution.

29. The method according to claim 26, wherein reducing the rate at which the selected MR element reads servo information comprises reducing the rate by greater than approximately 90% relative to a nominal servo sampling rate.

30. The method of claim 26, wherein selecting the selected MR element for activation comprises excluding from selection an MR element operating in an anomalous manner.

31. A method of extending a service life of a plurality of magnetoresistive (MR) elements provided on one or more read/write heads, comprising:
    detecting an idle period during which the MR elements are not performing data transfer operations;
    selecting an MR element from the plurality of MR elements having a minimum of energy dissipation;
    moving the selected MR element to a target position of a disk surface, the target position representing a position at which head-to-disk surface clearance is at a maximum; and reducing, during the idle period, a rate at which the selected MR element reads servo information from the disk surface at the target position so as to reduce usage of the selected MR element.

32. The method of claim 31, wherein reducing the rate at which the selected MR element reads servo information comprises reducing the rate from a first number of servo samples per disk revolution associated with nominal operation to a second number of servo samples per disk revolution, the second number of servo samples per disk revolution being less than the first number of servo samples per disk revolution.

33. The method of claim 31, wherein reducing the rate at which the selected MR element reads servo information comprises reducing the rate from a number of servo samples per disk revolution associated with nominal operation to one servo sample per disk revolution.

34. The method of claim 31, wherein reducing the rate at which the selected MR element reads servo information comprises reducing the rate by greater than approximately 98% relative to a nominal servo sampling rate.

35. An apparatus provided in a disk drive system for extending a service life of data transfer heads comprising:

a data storage disk;

a plurality of data transfer heads;

a magnetoresistive (MR) element provided on each of the heads;

an actuator for providing relative movement between the heads and the disk; and a processor that controls a sampling rate of servo information derived from the disk using the MR elements, the processor, during a period of disk drive system inactivity, selecting an MR element from the plurality of MR elements having a minimum of energy dissipation, moving the selected MR element to a target position of a disk surface, the target position representing a position at which head-to-disk surface clearance is at a maximum, and reducing the sampling rate of the selected MR element from a first number of servo samples per disk revolution to a second number of servo samples per disk revolution, the second number of servo samples per disk revolution being less than the first number of servo samples per disk revolution.

36. The apparatus of claim 35, wherein the processor reduces the sampling rate such that the reduction from the first number of servo samples to the second number of servo samples represents greater than approximately a 98% reduction in the sampling rate.

37. The apparatus of claim 35, wherein the processor reduces the sampling rate from the first number of servo samples per disk revolution associated with nominal operation to one servo sample per disk revolution.

38. The apparatus of claim 35, wherein the processor increases the sampling rate from the second number of servo samples to the first number of servo samples in response to a disk drive system signal.

\* \* \* \* \*